Patented Aug. 29, 1944

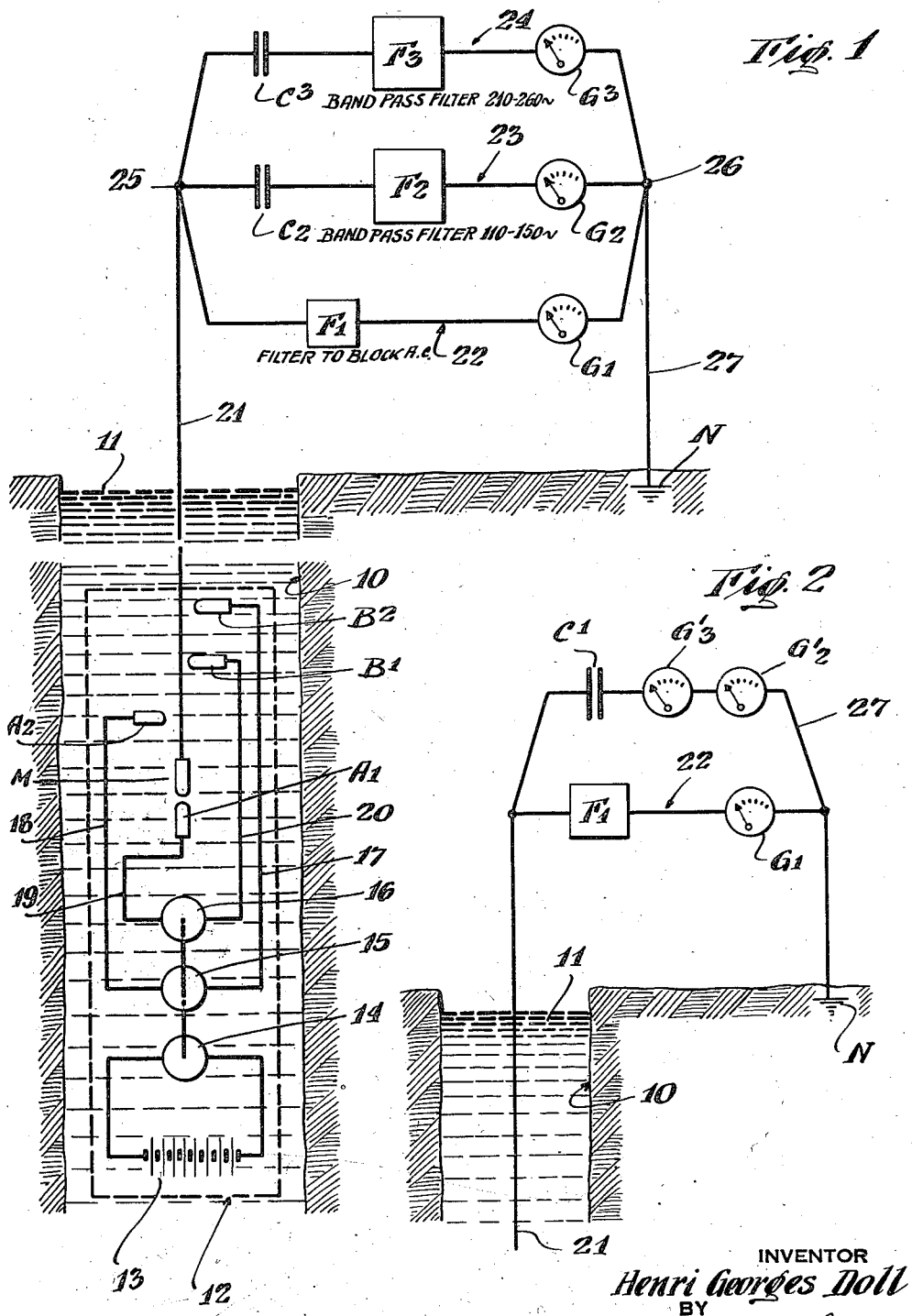

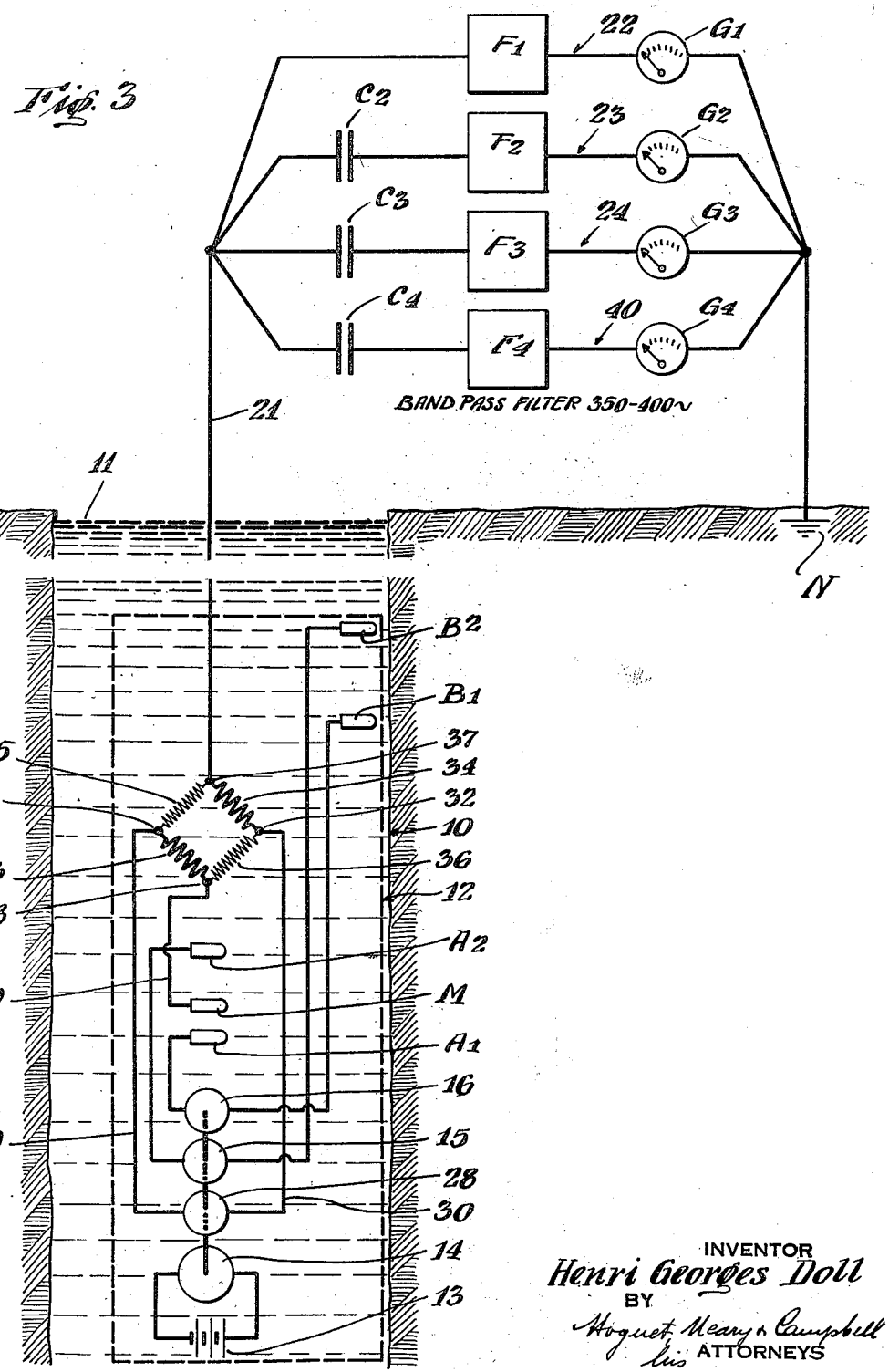

2,357,177

UNITED STATES PATENT OFFICE 2,357,177

METHOD AND APPARATUS FOR CONDUCTING DIFFERENT INVESTIGATIONS SIMULTANEOUSLY IN BOREHOLES

Henri Georges Doll, Paris, France, assignor, by mesne assignments, to Schlumberger Well Surveying Corporation, Houston, Tex., a corporation of Delaware Application December 12, 1939, Serial No. 308,767
In France December 16, 1938

13 Claims. (Cl. 175—182)

The present invention relates to the investigation of bore holes drilled into the earth and more particularly to methods and apparatus for simultaneously investigating a plurality of different subjects of interest in a bore hole.

More specifically, it relates to methods and apparatus of this character in which the response of investigation means disposed in the bore hole is transmitted electrically to indicating means located a considerable distance away as, for example, at the surface of the earth.

This application is concerned particularly with those subjects of investigation in a bore hole which either provide information about the geologic formations through which it extends, or which are indicative of conditions therein. The subjects most generally investigated in a bore hole include the relative impedance, apparent resistivity and thermal conductivity of the formations surrounding the bore hole, and the spontaneous potentials existing in it. Also, indications are frequently obtained of the temperature of the bore hole and the temperature and resistivity of any liquid contained therein.

An important object of the invention is to provide a new and improved method and apparatus for simultaneously investigating a plurality of different subjects of interest in a bore hole in which the number of conductors connecting the investigation means in the bore hole with indicating means at the surface of the earth is reduced to a minimum.

A further object of the invention is to provide a new and improved method and apparatus of the above character in which the responses of the investigating means corresponding to the respective subjects being investigated are transmitted electrically to suitable indicating means at the surface of the earth through a single electrical circuit, comprising preferably a single conductor.

The objects of the invention are attained by employing investigating means which is adapted to provide a plurality of electrical values, such as currents or potential differences, for example, of different and separable character, each of which is a function of a subject of interest in a bore hole. These electrical values of different character are transmitted through a single circuit to the surface of the earth where they are indicated separately by suitable indicating means.

Where an electrical characteristic of the formations surrounding the bore hole is to be investigated at several different depths of investigation, as disclosed in my copending application Serial No. 190,652, filed February 15, 1938, now U. S. Patent No. 2,317,259, dated April 20, 1943, the investigating means may be adapted to set up a plurality of different electrical fields in the formations which are of such character that they may be readily separated from one another. The expression "depth of investigation" as used herein and in this art means generally "lateral" depth or horizontal distance, as referred to the wall of the bore hole. Electrical characteristics of the created fields are obtained, which are, respectively, functions of different electrical characteristics of the formations. The electrical characteristics of the created fields are transmitted through a single electrical circuit to suitable means at the surface of the earth for indicating them separately.

The invention also contemplates the investigation of the direct current field produced by spontaneous potentials existing in the bore hole simultaneously with a plurality of different subjects of interest therein, as described in detail below.

Additional features of the invention will become apparent from the following detailed description of several specific embodiments taken in connection with the accompanying drawings in which:

Figure 1 is a schematic diagram of apparatus constructed according to the invention for simultaneously obtaining indications of an electrical characteristic of the formations at two different depths of investigation, together with spontaneous potentials existing in the bore hole;

Figure 2 illustrates schematically a modified form of indicating means for use in connection with the apparatus shown in Figure 1; and Figure 3 is a schematic diagram illustrating apparatus constructed according to the invention for simultaneously obtaining indications of an electrical characteristic of the formation at two different depths of investigation, together with the temperature of the liquid contained in the bore hole.

Considering Figure 1, a bore hole 10 is shown in cross-section containing the liquid 11 into which the investigation means 12 is lowered. Ordinarily the investigating means 12 will be enclosed in a suitable casing, but for the sake of clarity, this is not shown in the drawings.

The investigating means 12 in the bore hole includes a source of current 13, such as for example, a battery which supplies current to a direct current motor 14 adapted to drive the alternators 15 and 16, respectively. The alternator 16 provides alternating current which is different in frequency from the alternating current supplied by the alternator 15. For example, if the alternator 15 generates 120 cycle alternating current, the alternator 16 should be designed to generate 240 cycle alternating current. Although any suitable frequencies may be chosen, it is desirable for constructional reasons that the frequency of one alternator be twice that of the other, because this may be accomplished conveniently by providing one alternator with twice as many poles as the other.

The alternator 15 is connected through the conductors 18 and 17 respectively, to a pair of spaced electrodes A2 and B2 respectively, which are adapted to set up a 120 cycle alternating field in the formations surrounding the bore hole. In similar fashion, the alternator 16 is electrically connected through the conductors 19 and 20, respectively, to a second pair of spaced electrodes A1 and B1, which are adapted to set up a 240 cycle electric field in the formations surrounding the bore hole.

For the purposes of this description, it will be assumed that the electrodes B1 and B2 are spaced at a considerable distance as, for example, a few yards from the electrodes A1 and A2 and that the electrodes A1 and A2 are spaced from each other a much shorter distance, such as for example, a few feet. It is to be clearly understood, however, that these distances are given merely by way of example and any other electrode spacings may be used, depending on the results desired.

Located in the vicinity of the electrodes A1 and A2 is a potential electrode M which is connected to a single conductor 21 upon which the investigating means 12 is supported in the bore hole 10, and through which its respective responses are transmitted electrically to indicating means at the surface of the earth. For convenience, it will be assumed that the distance between the electrode A1 and the electrode M is in the neighborhood of the diameter of the bore hole, and the distance between the electrode M and the electrode A2 is several times the diameter of the bore hole. For the sake of clarity, the respective distances between the electrodes have not been shown in the drawings in their proper relationship to the diameter of the bore hole.

The indicating means at the surface of the earth includes a circuit 22 for obtaining indications of continuous potentials, a circuit 23 for obtaining indications of 120 cycle alternating current potentials and a third circuit 24 for obtaining indications of 240 cycle alternating current potentials. The indicating circuits 22, 23 and 24 are connected in parallel, one end 25 of the parallel circuit being connected to the conductor 21, and the other end 26 being connected through a conductor 27 to a ground point N at the surface of the earth.

The circuit 22 for providing indications of continuous potentials includes a recording type continuous potential indicating instrument G1 connected in series with a filter F1 which is designed to prevent the flow of any alternating current therethrough.

The circuit 23 for obtaining indications of 120 cycle alternating current potentials includes a recording type alternating current indicating instrument G2 connected in series with a condenser C2 for blocking the passage of continuous currents, and a filter F2 of the band pass type adapted to pass alternating current in the frequency range of 110 to 150 cycles, for example.

The circuit 24 for obtaining indications of 240 cycle alternating current potential differences includes a recording type instrument G3 for providing indications of alternating current potential differences, connected in series with a condenser C3 for blocking the passage of continuous currents and a filter F3, which may also be of the band pass type, designed to pass alternating currents in the frequency range from 210 to 260 cycles, for example.

In operation, the alternator 15 supplies 120 cycle alternating current to the electrodes A2 and B2 creating a 120 cycle alternating field in the formations surrounding the bore hole. This alternating field in the formations produces a corresponding alternating potential difference between the electrode M in the bore hole and the electrode N grounded at the surface of the earth, which is a function of the impedance or apparent resistivity of the formations. This potential difference is transmitted through the conductor 21, the condenser C2, and the filter F2 to the alternating current indicating instrument G2, thus providing indications of the impedance or apparent resistivity of the formations at one depth of investigation.

At the same time, the 240 cycle potential difference impressed upon the electrodes A1 and B1 by the alternator 16 creates a corresponding 240 cycle alternating field in the formations, thereby producing a 240 cycle alternating potential difference between the electrode M in the bore hole and the electrode N, which is a function of the impedance or apparent resistivity of the formations at a different depth of investigation. This 240 cycle potential difference is transmitted through the conductor 21, the condenser C3 and the filter F3 to the alternating current indicating instrument G3, thereby providing indications of apparent resistivity at a second depth of investigation.

Meanwhile, the direct current field produced by spontaneous potentials existing in the bore hole creates a continuous potential difference between the electrodes M and N which is transmitted through the conductor 21 and the filter F1 to the continuous potential indicating instrument G1, thereby providing indications of spontaneous potentials in the bore hole.

As disclosed in my above mentioned copending application, by comparing the indications of impedance or apparent resistivity obtained at two different depths of investigation, highly accurate data regarding the true resistivity of the strata may be obtained in bore holes in which portions of the strata are flooded with bore hole liquid.

If desired, vibration type galvanometers may be used, as shown in Figure 2, for recording directly and separately current amplitudes corresponding to the respective frequencies, instead of the filter circuits illustrated in Figure 1. Where this is done, one of the alternating current indicating circuits may be dispensed with and a single circuit 27 may be utilized to provide indications of both the 120 cycle and the 240 cycle alternating potential differences between the electrode M in the bore hole and the electrode N grounded at the surface of the earth.

The indicating circuit 27 includes a vibration type galvanometer G'2, resonant at 120 cycles, and a vibration type galvanometer G'3 resonant at 240 cycles, connected in series with a condenser C1, the function of which is to prevent direct current from passing to galvanometers G'2 and G'3. The galvanometers G1 and G'2 and G'3 may be of the recording type, in which case a record may be obtained of the direct current potential, the 120 cycle alternating potential and the 240 cycle alternating potential between the electrode M in the bore hole and the electrode N at the surface of the earth.

If desired, another subject of interest, such as for example the temperature of the liquid 11 in the bore hole may be investigated, together with the impedance or apparent resistivity of the formations at two different depths in the bore hole, and the spontaneous potentials existing therein, as shown in Figure 3.

This modification is similar to the apparatus illustrated in Figure 1, except that it includes a third alternator 28 which is also adapted to be driven by the direct current motor 14, and which is connected through the conductors 29 and 30, respectively, to the apices 31 and 32 of a resistance bridge responsive to variations in temperature. The resistance bridge may be of the type described in my copending application Serial No. 181,879, filed December 27, 1937, now U. S. Patent No. 2,249,751, dated July 22, 1941, and it may comprise, for example, a pair of resistors 33 and 34 having a relatively high temperature coefficient of resistivity, connected to a second pair of resistors 35 and 36 having a negligible temperature coefficient of resistivity.

The alternator 28 should be designed to supply alternating current which is different in frequency from the frequencies of the current supplied by the alternators 15 and 16 and its frequency may be, for example, 360 cycles.

Alternating current of this frequency is supplied through the conductors 29 and 30 to the apices 31 and 32 of the resistance bridge. The values of the resistors 33, 34, 35 and 36 are so chosen that for a given reference temperature the bridge is in equilibrium and no potential difference exists across the apices 37 and 38. In this modification, the potential electrode M in the bore hole is connected through a conductor 39 to the apex 38 of the resistance bridge, the other apex 37 of which is connected to the conductor 21.

The indicating apparatus at the surface of the earth is analogous to the indicating apparatus disclosed in Figure 1, except that it includes an additional indicating circuit 40 for providing indications of 360 cycle alternating potential differences between the electrode M in the bore hole and the electrode N grounded at the surface of the earth. The circuit 40 includes a recording type instrument G4 for providing indications of alternating potentials, which is connected in series with a condenser C4, for blocking the passage of direct current, and a filter F4. The filter F4 may be of the band pass type, designed to permit only the flow of alternating currents in the frequency range of from 350 to 400 cycles, for example.

As in the modification illustrated in Figure 1, the indicating circuits 22, 23 and 24 provide indications of apparent resistivity at two different depths of investigation and spontaneous potentials existing in the bore hole. In addition, the indicating circuit 40 provides indications of the difference between the temperature of the liquid in the bore hole and the temperature at which the resistance bridge located therein is in equilibrium.

If the temperature of the bore hole liquid is different from this equilibrium temperature, then a 360 cycle alternating potential difference will exist across the apices 37 and 38 of the resistance bridge, which will be transmitted through the conductor 21, the condenser C4, and the filter F4 to the alternating current potential indicating instrument G4, thereby providing indications of the difference in temperature.

While alternating currents of any desired frequency may be employed, the frequencies chosen should preferably be substantially different from the frequencies of the currents supplied by power companies in the region of the bore hole. Where this is done, parasitic potential differences which might be produced by leakage through the ground or by induction in the measurement circuit are eliminated. Inasmuch as frequencies of 50 or 60 cycles are often used in bore hole regions, frequencies substantially higher than these have been chosen in the above description. It should be understood, however, that frequencies lower than 50 or 60 cycles may be used with good results.

It will be apparent from the foregoing, that instead of obtaining indications of resistivity at two different depths of investigation, indications of resistivity might be obtained at three or four different depths of investigation, if desired. This may be accomplished by providing the appropriate number of energizing circuits in the bore hole, together with corresponding indicating circuits at the surface of the earth.

While several specific embodiments have been described in the foregoing specification, the invention is not intended to be in any way limited thereby, but is susceptible of numerous changes in form and detail within the scope of the appended claims.

I claim:

1. A method of obtaining indications simultaneously of two different electrical characteristics of the formations surrounding a bore hole and spontaneous potentials existing therein, comprising the steps of simultaneously creating two separably different electric fields in the formations, obtaining electrical values from said respective fields which are functions of the respective electrical characteristics of the formations to be investigated, obtaining continuous potentials which are a function of spontaneous potentials existing in the bore hole, combining said electrical values and continuous potentials, transmitting said combined electrical values and potentials to the surface of the earth, and obtaining separate indications of said respective electrical values and continuous potentials.

2. A method of obtaining indications simultaneously of two different electrical characteristics of the formations surrounding a bore hole and of spontaneous potentials existing therein, comprising the steps of simultaneously creating two alternating electrical fields of different frequency in the formations, obtaining alternating potential differences between two points in said fields and produced thereby, each of which potential differences is a function of an electrical characteristic of the formations, obtaining continuous potentials produced by spontaneous potentials in the bore hole, combining said alternating potential differences and continuous potentials, transmitting said combined alternating potential differences and continuous potentials to the surface of the earth, separating said respective alternating potential differences and continuous potentials, and obtaining indications of said separated alternating potential differences and continuous potentials.

3. Apparatus for determining the nature of earth formations traversed by a bore hole having a continuous electric field therein which is a function of spontaneous potentials existing therein, comprising means for simultaneously creating a plurality of alternating electric fields of different frequency in the formations, a grounded conductor connected to an electrode disposed in the bore hole in the vicinity of said created fields, for transmitting electrical characteristics of said created fields and any continuous electric field to the surface of the earth, means for separating said respective characteristics, and means for providing indications of said separated characteristics.

4. Apparatus for investigating a plurality of different subjects of interest in a bore hole, comprising means for simultaneously creating a plurality of separably different electric fields in the formations surrounding the bore hole, electrical indicating means, an electrical circuit for transmitting to said indicating means electrical characteristics of said created fields, which are respectively functions of different electrical characteristics of the formations, and means for simultaneously producing in said electrical circuit a voltage which is a function of at least one other subject of investigation in the bore hole.

5. Apparatus for investigating a plurality of different subjects of interest in a bore hole having an electric field therein which is a function of spontaneous potentials existing therein, comprising means for simultaneously creating a plurality of different periodically variable electric fields in the formations, indicating means, an electrical circuit for transmitting to said indicating means an electrical characteristic of said continuous field which is a function of spontaneous potentials existing in the bore hole, and electrical characteristics of said periodically variable fields which are respectively functions of different electrical characteristics of the formations, and means for simultaneously producing in said electrical circuit a voltage which is a function of at least one other subject of investigation in the bore hole.

6. Apparatus for investigating a plurality of different subjects of interest in a bore hole, comprising means for simultaneously creating a plurality of separably different electrical fields in the formations surrounding the bore hole, a grounded conductor connected to an electrode disposed in the bore hole in the vicinity of said created fields, for transmitting to the surface of the earth electrical characteristics of said different created fields which are respectively functions of different electrical characteristics of the formations, means for simultaneously producing in said conductor a voltage which is a function of at least one other subject of investigation in the bore hole, means for separating said voltage and respective electrical characteristics in the conductor from each other, and means for providing indications of said separated voltage and electrical characteristics.

7. Apparatus for investigating a plurality of different subjects of interest in a bore hole having a continuous electric field therein which is a function of spontaneous potentials existing therein, comprising means for simultaneously creating a plurality of alternating electric fields of different frequency in the formations surrounding the bore hole, a grounded conductor connected to an electrode disposed in the bore hole in the vicinity of said created fields, for transmitting to the surface of the earth electrical characteristics of said different created fields which are respectively functions of different electrical characteristics of the formations, and an electrical characteristic of said continuous field which is a function of spontaneous potentials in the bore hole, means for simultaneously producing in said conductor a voltage which is a function of at least one other subject of investigation in the bore hole, means for separating said voltage and respective electrical characteristics in the conductor from each other, and means for providing indications of said separated voltage and electrical characteristics.

8. Apparatus for investigating bore holes, comprising a plurality of spaced current electrodes adapted to be lowered into the bore hole, an alternator connected to two of said current electrodes for creating an alternating current field of first frequency in the formations, a second alternator connected to two different current electrodes for creating an alternating current field of second frequency in the formations, a motor for driving said alternators, a source of voltage for said motor, a conductor having its upper end grounded at the surface of the earth and being connected to an electrode disposed in the bore hole in the vicinity of said created fields, alternating current indicating means connected to said conductor, filter means for blocking the passage of alternating current of second frequency to said indicating means, second alternating current indicating means connected to said conductor, second filter means for blocking the passage of alternating current of first frequency to said second indicating means, continuous current indicating means connected to said conductor, and third filter means for blocking the passage of alternating currents to said last-named indicating means.

9. Apparatus for investigating bore holes, comprising a plurality of spaced current electrodes adapted to be lowered into the bore hole, an alternator connected to two of said current electrodes for creating an alternating current field of first frequency in the formations, a second alternator connected to two different current electrodes for creating an alternating current field of second frequency in the formations, a motor for driving said alternators, a source of voltage for said motor, a conductor having its upper end grounded and being connected to an electrode disposed in the bore hole in the vicinity of said created fields, indicating means resonant at said first frequency connected to said conductor, second indicating means resonant at said second frequency connected to said conductor, continuous current indicating means connected to said conductor, and filter means for blocking the passage of alternating current to said last-named indicating means.

10. Apparatus for investigating bore holes, comprising a plurality of spaced current electrodes adapted to be lowered into the bore hole, an alternator connected to two of said current electrodes for creating an alternating current field of first frequency in the formations, a second alternator connected to two different current electrodes for creating an alternating current field of second frequency in the formations, an impedance bridge responsive to variations in temperature in the bore hole, a third alternator connected across one diagonal of said bridge for supplying alternating current of third frequency thereto, a motor for driving said alternators, a source of voltage for said motor, a conductor having its upper end grounded, said conductor being connected in series with the other diagonal of the bridge and to an electrode disposed in the bore hole in the vicinity of said created fields, a plurality of alternating current indicating means connected to the conductor, said indicating means being responsive only to alternating currents of said first, second and third frequencies, respectively, and continuous current indicating means connected to said conductor.

11. A method of simultaneously investigating electrical characteristics at different depths of investigation of the formations surrounding a bore hole, comprising the steps of simultaneously generating in the bore hole a plurality of alternating currents of different frequencies, passing all of said generated currents through the adjoining formations by applying them to the formations in such a way as to be differently affected by electrical characteristics of the formations at different depths of investigation, obtaining electrical values from said respective currents resulting from their passage through said formations, which values are functions of the electrical characteristics of the formations at different depths of investigation, respectively, combining said electrical values, applying said combined electrical values to a single electrical circuit, and obtaining therefrom at the surface of the earth, separate simultaneous indications of said electrical values.

12. A method of simultaneously investigating electrical characteristics at different depths of investigation of the formations surrounding a bore hole, comprising the steps of simultaneously generating in the bore hole a plurality of alternating currents of different frequencies, passing all of said generated curents through the adjoining formations by applying them to the formations in such a way as to be differently affected by electrical characteristics of the formations at different depths of investigation, obtaining alternating potential differences from said respective currents resulting from their passage through said formations, which alternating potential differences are functions of the electrical characteristics of the formations at different depths of investigation, respectively, combining said alternating potential differences, applying said combined alternating potential differences to a single electrical circuit, and obtaining therefrom at the surface of the earth separate simultaneous indications of said alternating potential differences.

13. Apparatus for simultaneously investigating electrical characteristics at different depths of investigation of the formations surrounding a bore hole, comprising means to generate simultaneously in the bore hole a plurality of alternating currents of different frequencies, means to pass all of said generated currents through the adjoining formations in such a way as to be differently affected by electrical characteristics of the formations at different depths of investigation, means in the bore hole to pick up electrical values from said respective currents resulting from their passage through said formations, a single electrical circuit extending to the surface of the earth, said pickup means being in electrical connection with said single electrical circuit to apply said electrical values to said single electrical circuit, means at the surface of the earth for simultaneously separating said electrical values from each other, and means for simultaneously indicating said separated values.

HENRI GEORGES DOLL.